US012679419B2

(12) United States Patent
　　Jia et al.

(10) Patent No.: US 12,679,419 B2
(45) Date of Patent: Jul. 14, 2026

(54) ALIGHTING POINT DETERMINATION METHOD AND ALIGHTING POINT DETERMINATION DEVICE

(71) Applicant: Nissan Motor Co., Ltd., Kanagawa (JP)

(72) Inventors: Shuyang Jia, Kanagawa (JP); Naoki Kojo, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 816 days.

(21) Appl. No.: 17/255,720

(22) PCT Filed: Jun. 26, 2018

(86) PCT No.: PCT/IB2018/000786
　　§ 371 (c)(1),
　　(2) Date: Dec. 23, 2020

(87) PCT Pub. No.: WO2020/002958
　　PCT Pub. Date: Jan. 2, 2020

(65) Prior Publication Data
　　US 2021/0269064 A1　　Sep. 2, 2021

(51) Int. Cl.
　　*B60W 60/00*　　(2020.01)
　　*G06Q 10/0631*　　(2023.01)
　　(Continued)

(52) U.S. Cl.
　　CPC . *B60W 60/00253* (2020.02); *G06Q 10/06311* (2013.01); *G08G 1/123* (2013.01); (Continued)

(58) Field of Classification Search
　　None
　　See application file for complete search history.

(56) References Cited

U.S. PATENT DOCUMENTS

2004/0254721 A1* 12/2004 Saiki ...................... G08G 1/127
　　　　　　　　　　　　　　　　　　　701/410
2013/0159028 A1* 6/2013 Lerenc ................... G06Q 10/02
　　　　　　　　　　　　　　　　　　　705/5

(Continued)

FOREIGN PATENT DOCUMENTS

CN　　　101832778 A　　9/2010
JP　　　2004227490 A　　8/2004

(Continued)

OTHER PUBLICATIONS

Brown Timothy, Matchmaking in Lyft Line, Parts 1-3, retrieved from: https://eng.lyft.com/matchmaking-in-lyft-line-9c2635fe62c4 on May 27, 2021. (Year: 2016) (Year: 2016).*

(Continued)

*Primary Examiner* — Adam D Tissot
*Assistant Examiner* — Charles Pall
(74) *Attorney, Agent, or Firm* — Osha Bergman Watanabe & Burton LLP

(57)　　　　　ABSTRACT

An alighting point determination method is used in a vehicle allocation system configured to move a vehicle to a predetermined point in response to a request from a user. The vehicle allocation system includes a processor. The processor operates to: set a predetermined range including a point associated with a first user; specify a second user who is expected to alight in the predetermined range; acquire a request point included in the request from each user; calculate an access cost for each user to reach the request point from a common point at which the users including at least the first user and the second user alight; and calculate as the predetermined point the common point obtained based on the calculated access cost for each of the first user and the second user.

8 Claims, 8 Drawing Sheets

(51) Int. Cl.
  *G08G 1/123* (2006.01)
  *H04W 4/40* (2018.01)

(52) U.S. Cl.
  CPC ........ *H04W 4/40* (2018.02); *B60W 2540/041*
    (2020.02); *B60W 2556/45* (2020.02)

(56) References Cited

U.S. PATENT DOCUMENTS

| | | | | |
|---|---|---|---|---|
| 2016/0034845 | A1* | 2/2016 | Hiyama | G06Q 10/02 |
| | | | | 705/7.15 |
| 2016/0037019 | A1 | 2/2016 | Xue et al. | |
| 2017/0365030 | A1* | 12/2017 | Shoham | G08G 1/207 |
| 2018/0060988 | A1 | 3/2018 | Klenk et al. | |
| 2018/0149484 | A1* | 5/2018 | Baer | G01C 21/3438 |
| 2019/0103028 | A1 | 4/2019 | Kobayashi et al. | |
| 2019/0287075 | A1* | 9/2019 | Awano | G06Q 30/0284 |
| 2020/0272955 | A1* | 8/2020 | Shimodaira | G06Q 10/047 |
| 2020/0279195 | A1 | 9/2020 | Kobori et al. | |

FOREIGN PATENT DOCUMENTS

| | | |
|---|---|---|
| JP | 2017182137 A | 10/2017 |
| JP | 6341352 B1 | 6/2018 |

OTHER PUBLICATIONS

Mitja Stiglic, Niels Agatz, Martin Savelsbergh, Mirko Gradisar, The benefits of meeting points in ride-sharing systems, Transportation Research Part B: Methodological, vol. 82, 2015, pp. 36-53, DOI 10.1016/j.trb.2015.07.025.(https://www.sciencedirect.com/science/article/pii/SO.*

Brown Timothy, Matchmaking in Lyft Line, Parts 1-3, retrieved from: https://eng.lyft.com/matchmaking-in-lyft-line-9c2635fe62c4 on May 27, 2021. (Year: 2016).*

Mitja Stiglic, Niels Agatz, Martin Savelsbergh, Mirko Gradisar, The benefits of meeting points in ride-sharing systems, Transportation Research Part B: Methodological, vol. 82, 2015, pp. 36-53, DOI 10.1016/j.trb.2015.07.025.(https://www.sciencedirect.com/science/article/pii/SO (Year: 2015).*

* cited by examiner

FIG.2

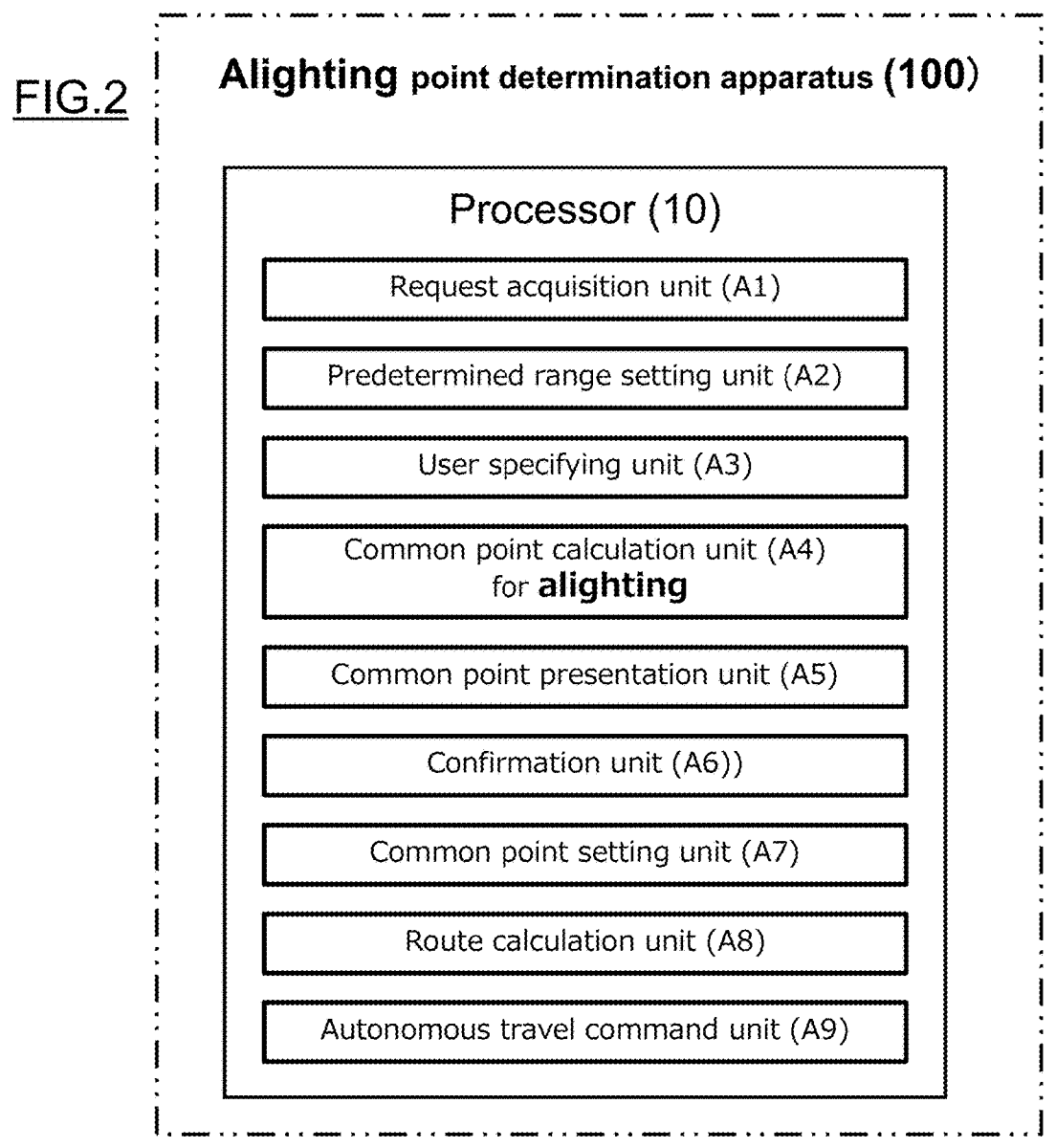

Alighting point determination apparatus (100)

Processor (10)

Request acquisition unit (A1)

Predetermined range setting unit (A2)

User specifying unit (A3)

Common point calculation unit (A4) for alighting

Common point presentation unit (A5)

Confirmation unit (A6))

Common point setting unit (A7)

Route calculation unit (A8)

Autonomous travel command unit (A9)

PC1=PB1=PD1=PD2≠PB2

PC1:(AV1 ≈ min)

PB2

PB1

V1

D1 D2

+Y

X

ALIGHTING POINT DETERMINATION METHOD AND ALIGHTING POINT DETERMINATION DEVICE

TECHNICAL FIELD

The present invention relates to an alighting point determination method and an alighting point determination apparatus that are used in a vehicle allocation system.

BACKGROUND ART

A system is known, which is configured to calculate one or more recommended boarding/alighting points on the basis of an access difficulty level for a user to reach the user's boarding/alighting point from a point requested by the user and allocate a vehicle to the boarding/alighting point selected by the user (Patent Document 1).

PRIOR ART DOCUMENT

Patent Document

[Patent Document 1] US2016/0370194A

SUMMARY OF INVENTION

Problems to be Solved by Invention

If the boarding/alighting points are determined in response to individual requests made by respective users, the boarding/alighting points may be set at positions close to each other. When the vehicle follows all the set boarding/alighting points, the vehicle has to make frequent stops, thus resulting in a problem in that the trip time increases.

A problem to be solved by the present invention is to provide an alighting point determination method and an alighting point determination apparatus that prevent a vehicle from making frequent stops and suppress an increase in the trip time while responding to a request from each user.

Means for Solving Problems

The present invention solves the above problem through specifying a second user who is expected to alight in a predetermined range including a point associated with a first user and calculating a common point at which users including at least the first user and the second user alight.

Effect of Invention

According to the present invention, it is possible to prevent a vehicle from making frequent stops and suppress an increase in the trip time while responding to a request from each user who desires the use of a vehicle allocation system.

BRIEF DESCRIPTION OF DRAWINGS

FIG. 2 is a block configuration diagram of a processor of the alighting point determination apparatus illustrated in FIG. 1.

MODE(S) FOR CARRYING OUT THE INVENTION

Hereinafter, one or more embodiments of the present invention will be described with reference to the drawings. The embodiments will be described by exemplifying a case in which the alighting point determination method and the alighting point determination apparatus are applied to a vehicle allocation system.

Figure 1:
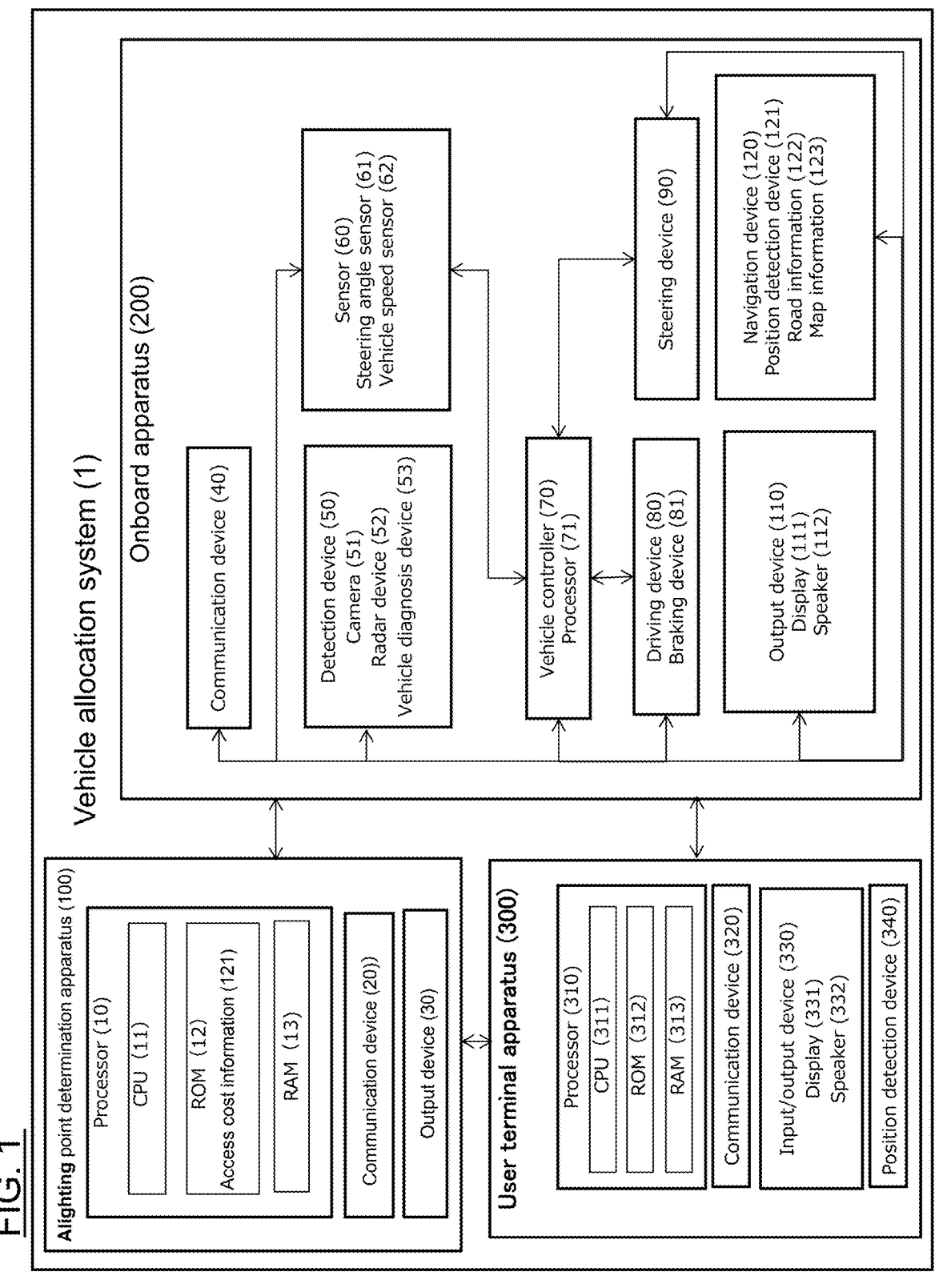
FIG. 1 is a block configuration diagram of a vehicle allocation system including an alighting point determination apparatus according to one or more embodiments of the present invention.

FIG. 1 is a diagram illustrating the block configuration of a vehicle allocation system 1. The vehicle allocation system 1 according to one or more embodiments of the present invention includes an alighting point determination apparatus 100, a control apparatus 200 of a vehicle, and a user terminal apparatus 300. Each apparatus includes a processor (computer) that executes a calculation process and a communication device. The alighting point determination apparatus 100, the control apparatus 200 of a vehicle, and the user terminal apparatus 300 each have a communication function and exchange information with one another by wire communication or wireless communication.

One or more embodiments of the present invention will be described for the vehicle allocation system 1 including the alighting point determination apparatus 100 which primarily performs a process of determining an alighting point.

Before alighting, the user was board, so the alighting point determination apparatus 100 also performs a process of determining the boarding point. The scheme of determining the alighting point is not particularly limited. Boarding point may be determined based on a user's request, or a predetermined point (appointed (designated) point) may be determined as a pick-up point. For example, it is a mode in which the user's boarding at the stadium has already been decided and the user alights at the point (stadium) requested by the user.

In the vehicle allocation system 1 according to one or more embodiments of the present invention, the alighting point determination apparatus 100 is provided in a separate server apparatus capable of communicating with the control apparatus 200 and the user terminal apparatus 300. The alighting point determination apparatus 100 may also be provided in the control apparatus 200 equipped in a vehicle. The user terminal apparatus 300 can communicate with the control apparatus 200 and another user terminal apparatus 300 and exchanges information including requests.

The user terminal apparatus 300 includes a processor 310, a communication device 320, an input/output device 330, and a position detection device 340 that responds to the global positioning system (GPS) or the like. The processor 310 controls operations of the communication device 320 and the input/output device 330. The input/output device 330 includes a display 331, a speaker 332, and a microphone for voice input, which is not illustrated. The display 331 is a touch panel-type display that has both an output (display) function and an input reception function. The display 331 receives an input from a user. The processor 310 generates a request that is an electronic command in response to an input operation, and transmits the request to the alighting point determination apparatus 100 via the communication device 320. The processor 310 acquires an alighting point (predetermined point) calculated by the alighting point determination apparatus 100 and displays it on the display 331. The processor 310 may display one or more predetermined points on the display 331. The predetermined points include a request point (a destination, a desired alighting point, an expected point at which alighting is desired, or an alighting point based on the past history) and a common point, which are each a point before being set as an alighting point. The presentation form of each point is not particularly limited. A point on the map may be displayed with a mark such as a pin or a flag, and/or the address of a point may be displayed as text on the display 331 or may also be output as voice via the speaker 332. The processor 310 acquires a vehicle allocation plan created by the vehicle allocation system 1 and displays the vehicle allocation plan on the display 331. The vehicle allocation plan includes a vehicle to be allocated, a travel route for the vehicle, a time of arrival at each predetermined point, and a time of arrival at a point at which a user alights (or boards). The processor 310 controls the speaker 332 to output an alert when receiving a new vehicle allocation plan, a change in the vehicle allocation plan, or the like.

The alighting point determination method according to one or more embodiments of the present invention is carried out by the alighting point determination apparatus 100. As illustrated in FIG. 1, the alighting point determination apparatus 100 according to one or more embodiments of the present invention is provided as an apparatus that is configured independently of the control apparatus 200 and the user terminal apparatus 300. In this case, the alighting point determination apparatus 100 serves as a server apparatus configured on a network through which communication is possible with the control apparatus 200 of a vehicle and the user terminal apparatus 300. The alighting point determination apparatus 100 is not limited in its installation form and may also be equipped in the control apparatus 200.

The vehicle according to one or more embodiments of the present invention has an autonomous travel function. The control apparatus 200 of a target vehicle controls the target vehicle to execute autonomous traveling. The target vehicle is allocated to be used by one or more users. The automated driving (autonomous traveling) may be unmanned fully automated driving or may also be manned partially automated driving. The scheme of autonomous traveling is not particularly limited. The control apparatus 200 recognizes a lane in which the target vehicle (subject vehicle) is traveling, and controls the movement of the target vehicle so that the position of a lane marker of the lane and the position of the target vehicle maintain a predetermined relationship. The control apparatus 200 controls the movement of the target vehicle so that the distance along the road width direction from a lane marker of a lane for vehicles to travel to the target vehicle (i.e., the lateral position of the target vehicle) falls within a predetermined value range. The lane marker is not limited, provided that it has a function of defining a lane. Examples of the lane marker may include line figures drawn on a road surface, luminous bodies embedded in a road, plants existing between lanes, and road structures existing on the road shoulder side of a lane, such as guardrails, curbstones, sidewalks, and exclusive roads for two wheels. The target vehicle to be selected is a vehicle that allows a user to board the earliest in response to the user's request.

As illustrated in FIG. 1, the control apparatus 200 of a vehicle according to one or more embodiments of the present invention includes a communication device 40, a detection device 50, a sensor 60, a vehicle controller 70, a driving device 80, a steering device 90, an output device 110, and a navigation device 120. These devices which constitute the control apparatus 200 are connected to one another via a controller area network (CAN) or other onboard LAN to mutually exchange information.

The detection device 50 detects the situation around the target vehicle. The detection device 50 detects the existence and existence position of an object existing around the target vehicle. Although not particularly limited, the detection device 50 according to one or more embodiments of the present invention includes a camera 51. The camera 51 is disposed at a predetermined position of the target vehicle and captures images around the target vehicle. The camera 51 according to one or more embodiments of the present invention is an imaging device including an imaging element such as a CCD or a CMOS. The camera 51 may also be an infrared camera or a stereo camera.

The detection device 50 according to one or more embodiments of the present invention has a radar device 52. Examples of the radar device 52 may be those, such as millimeter-wave radar, laser radar, and ultrasonic radar, which are known at the time of filing the present application. The detection device 50 processes the acquired measurement data to acquire the distance from the target vehicle to an object existing around the target vehicle and/or the direction in which the object exists with respect to the target vehicle, on the basis of the position of the object.

The above-described camera 51 and radar device 52 may be those disposed outside the vehicle. For example, detection information acquired by a camera 51 and/or a radar device 52 provided in a road facility may be acquired via an external device of the intelligent transport system (ITS) or the like.

The sensor 60 according to one or more embodiments of the present invention includes a steering angle sensor 61 and a vehicle speed sensor 62. The steering angle sensor 61 detects a traveling direction based on steering information regarding the steering, such as the steering amount, steering speed, and steering acceleration of the target vehicle, and transmits the detected traveling direction to the vehicle controller 70. The vehicle speed sensor 62 detects a traveling speed (including zero when stopping) based on the traveling direction of the target vehicle, the vehicle speed/acceleration of the target vehicle, etc. and transmits the detected traveling speed to the vehicle controller 70.

The vehicle controller 70 according to one or more embodiments of the present invention is an onboard computer such as an electronic control unit (ECU) and electronically controls the driving of the vehicle. The vehicle controller 70 includes a processor 71 that executes a process of the automated driving (autonomous traveling). The vehicle according to one or more embodiments of the present invention may be, for example, an electric car having an electric motor as the traveling drive source, an engine car having an internal-combustion engine as the traveling drive source, or a hybrid car having both an electric motor and an internal combustion engine as the traveling drive sources. Examples of the electric car or hybrid car having an electric motor as the traveling drive source include a type in which the power source for the electric motor is a secondary battery and a type in which the power source for the electric motor is a fuel cell.

The driving device 80 according to one or more embodiments of the present invention includes a drive mechanism of the target vehicle. The drive mechanism includes an electric motor and/or an internal-combustion engine as the above-described traveling drive sources, a power transmission device including a drive shaft and an automatic transmission that transmit the output of the traveling drive sources to the drive wheels, and a braking device 81 that brakes the wheels. The driving device 80 generates respective control signals for these components of the drive mechanism and executes the travel control including acceleration/deceleration of the vehicle. These control signals for the drive mechanism are generated on the basis of input signals by an accelerator operation and a brake operation and control signals acquired from the vehicle controller 70. Control information may be transmitted to the driving device 80, which can thereby perform the travel control including acceleration/deceleration of the vehicle in an automated or autonomous manner. In the case of a hybrid car, the driving device 80 may receive a ratio of the torque output to the electric motor and the torque output to the internal-combustion engine in accordance with the traveling state of the vehicle.

The steering device 90 according to one or more embodiments of the present invention includes a steering actuator. The steering actuator includes a motor and other necessary components attached to the steering column shaft. The steering device 90 executes the control of changing the traveling direction of the vehicle on the basis of a control signal acquired from the vehicle controller 70 or an input signal by the steering operation. The vehicle controller 70 transmits the control information including the steering amount to the steering device 90 thereby to execute the control of changing the traveling direction.

The navigation device 120 has a position detection device 121, road information 122 on the road type (right/left turn lane), road width, road shape, and others, and map information 123 including the road information 122. The navigation device 120 calculates a route from the current location detected by the position detection device 121 to the destination and a way point on the route and outputs the route information and the current location to the vehicle controller 70 of the target vehicle. Any of predetermined points (including the common point) based on the request points of users is the way point or destination of the target vehicle.

The vehicle controller 70 controls the vehicle to travel autonomously in accordance with the route acquired from the navigation device 120. The vehicle controller 70 also controls the vehicle to make a stop autonomously at the way point (predetermined point) acquired from the navigation device 120. At the way point (predetermined point), the vehicle controller 70 controls the vehicle to execute unlocking and opening a door and then execute closing and locking the door after a predetermined time. The vehicle controller 70 controls the vehicle to start and move to the next way point (predetermined point).

The output device 110 according to one or more embodiments of the present invention outputs information regarding the driving action based on a driving plan. Execution of the steering operation and/or acceleration/deceleration is notified as the information regarding the driving action via a display 111 and/or a speaker 112. Additionally or alternatively, the output device 110 according to one or more embodiments of the present invention may output various information items regarding the travel assistance to an external device of the intelligent transport system (ITS) or the like via the communication device 40.

The user terminal apparatus 300 will be described. The user terminal apparatus 300 is a small computer, such as a personal digital assistant (PDA) or a smartphone, which can be carried by a user. As illustrated in FIG. 1, the user terminal apparatus 300 includes the processor 310, the communication device 320, and the input/output device 330. The user terminal apparatus 300 exchanges information with the control apparatus 200 of a vehicle and/or the alighting point determination apparatus 100 via the communication device 320.

The input/output device 330 includes the display 331 and the speaker 332. The display 331 is a touch panel-type display. The display 331 receives the input of a request from a user. The request includes information associated with the user. The request includes a request point, user identification information, reservation date and time, information for specifying a reserved vehicle, an attribute of the user, a preference of the user, a travel history of the user, a history of the boarding/alighting points of the user, etc. The request is transmitted to the alighting point determination apparatus 100. Request points include a boarding point, an alighting point, a destination, and a current location. Each request point includes information on the point obtained from the information associated with the user who made the request, in addition to information on the point included in the request. Request points include a boarding point, an alighting point, and a destination that are expected on the basis of the user's travel history and/or boarding/alighting history. Request points further include a boarding point, an alighting point, and a destination that are calculated on the basis of the user's preference. Request points are included in predetermined points for the vehicle allocation.

The alighting point determination apparatus 100 according to one or more embodiments of the present invention will be described below. The alighting point determination apparatus 100 according to one or more embodiments of the present invention constitutes a part of the vehicle allocation system 1. The alighting point determination apparatus 100 exchanges information with the control apparatus 200 of a vehicle and the user terminal apparatus 300. The alighting point determination apparatus 100 calculates the common point as an alighting point at which one or more users alight from the vehicle.

The alighting point determination apparatus 100 according to one or more embodiments of the present invention is a server configured on a communication network. The alighting point determination apparatus 100 determines an alighting point, creates a vehicle allocation plan, and generates an execution command for a vehicle allocation process. Separate processors may be equipped for creating the vehicle allocation plan and generating the execution command for the vehicle allocation process, but in the present example, a processor 10 of the alighting point determination apparatus 100 executes the vehicle allocation process in an integrated manner.

As illustrated in FIG. 1, the alighting point determination apparatus 100 according to one or more embodiments of the present invention includes the processor 10, a communication device 20, and an output device 30. The communication device 20 exchanges information with the control apparatus 200 of a vehicle and/or the user terminal apparatus 300. The output device 30 presents the calculation result as necessary.

The processor 10 of the alighting point determination apparatus 100 is a computer including a read only memory (ROM) 12 that stores programs for executing the movement of a target vehicle to be allocated to one or more predetermined points including the calculated common point, a central processing unit (CPU) 11 as an operation circuit that executes the programs stored in the ROM 12 to serve as the alighting point determination apparatus 100, and a random access memory (RAM) 13 that serves as an accessible storage device.

The processor 10 of the alighting point determination apparatus 100 according to one or more embodiments of the present invention has a request acquisition function, a predetermined range setting function, a user specifying function, and a common point calculation function. The control device 10 according to one or more embodiments of the present invention executes each function by cooperation of software for achieving the above functions and the above-described hardware.

As an example, FIG. 2 illustrates functional blocks of the processor 10. As illustrated in FIG. 2, the processor 10 according to one or more embodiments of the present invention includes a request acquisition unit A1 that acquires a request, a predetermined range setting unit A2 that sets a predetermined range, a user specifying unit A3 that specifies a user, a common point calculation unit A4 that calculates a common point for alighting, a common point presentation unit A5 that presents the common point, a confirmation unit A6 that confirms an acceptance from a user, a common point setting unit A7 that sets the common point, a route calculation unit A8 that calculates a route, and an autonomous travel command unit A9 that controls a vehicle to travel autonomously. Each unit of the processor 10 calculates an operation command for performing each of the above processes and transmits the command to the control apparatus 200 or user terminal apparatus 300 in which the calculated operation command is executed.

The vehicle allocation system 1 according to one or more embodiments of the present invention includes a plurality of vehicles and controls each vehicle to move to a predetermined point in response to the request from a user. Predetermined points include a boarding point or alighting point desired by a user or a current location or destination of a user.

The vehicle allocation system 1 may control a vehicle to move to a predetermined point on the basis of the request from a single user. This is a case in which a vehicle moves to a request point of a single user who desires alighting, on the basis of the request from the user. The vehicle allocation system 1 may control a vehicle to move to a predetermined point on the basis of the requests from a plurality of users. This is a case in which a vehicle with one or more users already on board moves to another user's boarding point or alighting point.

The alighting point determination apparatus 100, which is a server apparatus, at least temporarily stores vehicle information acquired from the control apparatuses 200 of a plurality of vehicles that can be targets of vehicle allocation. The vehicle information includes general information indicating a vehicle state managed by a vehicle, such as the positional information, traveling direction, vehicle speed, steering amount, remaining energy amount, door lock information, seat belt attachment/detachment information, seating information, and automated (autonomous) driving situation of the vehicle, which are associated with the identification information of the vehicle. The alighting point determination apparatus 100 stores information regarding vehicle allocation control, such as a request for vehicle allocation, an execution situation (progress information) of a vehicle allocation plan, the presence/absence and number of users on board, a boarding/alighting status (progress of boarding/alighting in the vehicle allocation plan), arrival at a predetermined point, and specifying of the next predetermined point. The information regarding the vehicle allocation control is associated with identification information of a vehicle and/or identification information of a user. The alighting point determination apparatus 100 stores the request from a user, past requests from the user, a past use history of the user, an attribute of the user, and a requirement from the user, which are associated with the identification information of the user.

Figure 3:
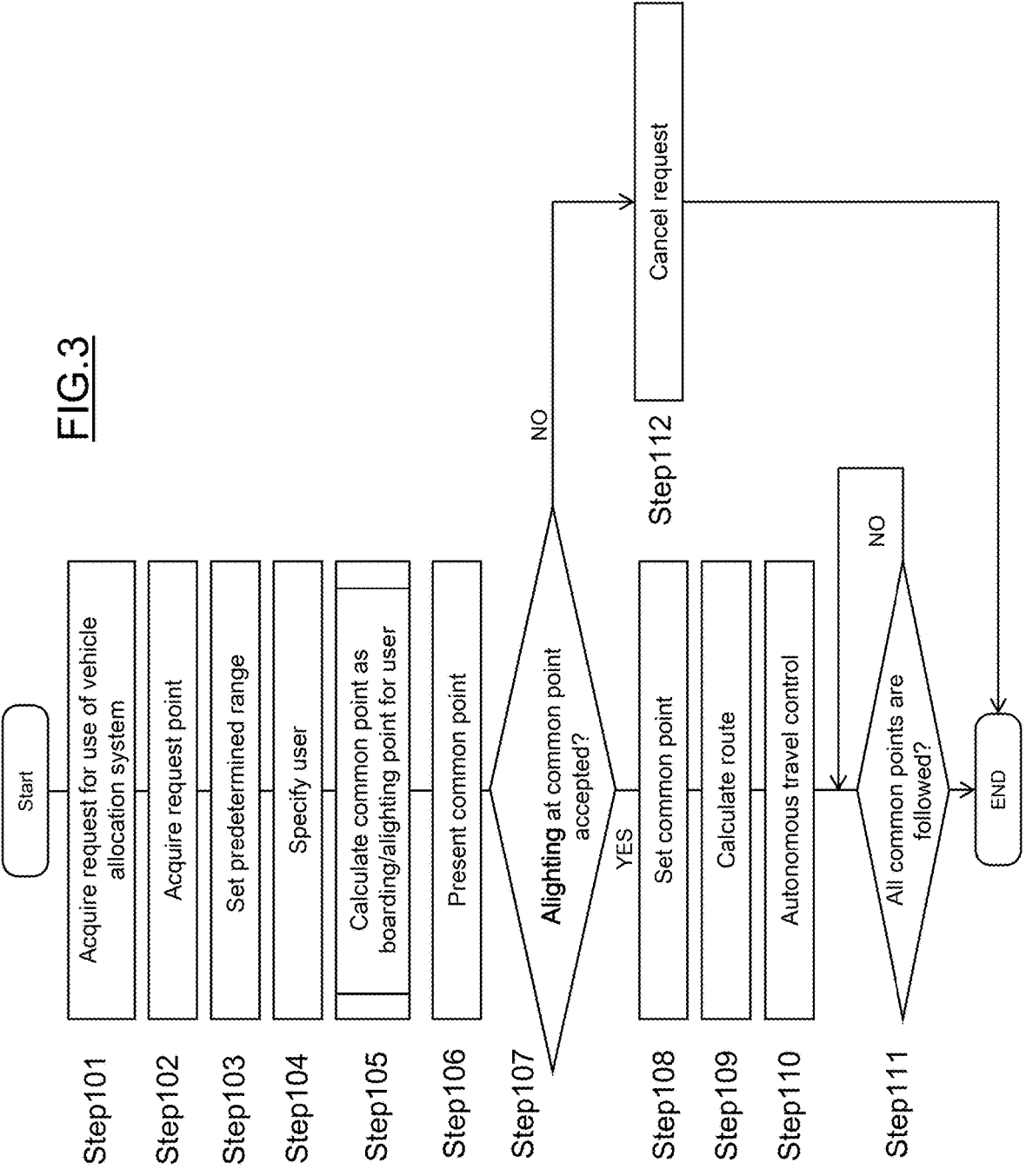
FIG. 3 is a chart illustrating an example of a control procedure executed in the vehicle allocation system including the alighting point determination apparatus.

Each function of the alighting point determination apparatus 100 according to one or more embodiments of the present invention will then be described along the control procedure. FIG. 3 illustrates an example of a control procedure executed in the vehicle allocation system 1 including the alighting point determination apparatus 100.

In step 101, the processor 10 acquires the request from a user who desires the use of the vehicle allocation system. The request includes a request point, request date and time, user identification information, information for specifying a reserved vehicle, an attribute of the user, a requirement from the user, a preference of the user, a usage history of the user, a history of the boarding/alighting points of the user, etc.

Information included in a request will be described. Request points include the destination of a user or an alighting point desired by the user to alight. The destination is a point at which a user having alighted will finally arrive after alighting. It is convenient for a user that the destination and the alighting point are close to each other because the movement amount of the user is small. The request point may be one of a plurality of points including stop-off points (way points). The request point may be represented by coordinate values such as latitude and longitude or may also be represented by identification information of a facility such as a stop or a station. The request point does not necessarily require positional information (coordinate values). The position in the identification information is acquired with reference to the map information 123. The request in which the current location of a user is set as the request point is a requirement from the user who desires the vehicle allocation to the location at which the user is located (current location). The request in which the alighting point designated by a user is set as the request point is a requirement from the user who needs to alight at a point desired by the user.

Request points included in the requests for desired alighting include an alighting point desired by a user, the destination of a user, or an alighting point at which a user is expected to alight. Information on the expected alighting point includes a preference of the user, a usage history of the user, and a history of past alighting points. The destination as the request point may be represented by input information of a route search or the like input to the user terminal apparatus 300 or may also be represented by an estimation result based on the user's schedule or action history. The destination estimated by the processor 310 may be automatically transmitted to the vehicle allocation system 1 including the alighting point determination apparatus 100 via the communication device 320.

Before alighting, the user was board on the basis of the request. Request points included in the requests for desired boarding include a boarding point desired by a user, the current location of the user, or a boarding point at which a user is expected to board. Information on the expected boarding point includes a preference of the user, a usage history of the user, and a history of past boarding points. The current location as the request point may be represented by a detection result of the position detection device 340 of the user terminal apparatus 300. The current location detected by the position detection device 340 may be automatically transmitted at a predetermined cycle to the vehicle allocation system including the alighting point determination apparatus 100 via the communication device 320. A request for alighting may be transmitted to the vehicle allocation system 1 together with the request for boarding. According to one or more embodiments of the present invention, the boarding point is not particularly limited, and may be a predetermined point (a stadium gate) or the like.

The user identification information is information for specifying a user. The request date and time are the date and time at which the vehicle allocation is desired (the date and time at which the boarding is desired or the date and time at which the alighting is desired (the time slot in which the boarding is desired or the time slot in which the alighting is desired)). The information for specifying a vehicle is information for a user to specify a desired vehicle. Examples of the desired vehicle include those having functions that satisfy the needs of users, such as a vehicle that can accommodate a desired number of users, a vehicle that can store a suitcase, a vehicle that can store a wheelchair, and a vehicle that is equipped with a child seat.

Attributes of a user include the user's age, user's gender, user's preference, user's schedule, user's usage history, history of the user's boarding/alighting points, and the form of a baggage carried by the user (a suitcase, a luggage having a predetermined size or more, or a luggage having a predetermined length or more). The requirement from a user includes information as to whether to accept or refuse ride-sharing.

The requirement from a user includes a required matter regarding movement. The vehicle allocation plan is created with reference to the requirement from a user. In one or more embodiments of the present invention, the designation of a request point is received, but the point for a vehicle to actually drop off an occupant may be a common point different from the request point; therefore, a user may be required to move to a destination from the common point or move to the common point. The user can preliminarily provide a restriction on the required movement in the request. The restriction on movement can be designated as a restriction value on any of a distance, a movement time, a walking time, and an altitude difference. By including this restriction in the request, it is possible to refuse boarding or alighting at a common point that requires movement of a restriction value (such as a restriction distance) or more. When a restriction on movement is provided, the user is required to move within the restricted range, which the user sets for himself/herself, around the boarding or alighting.

For example, when alighting, the user can alight at a common point to which the walking time is X minutes or less or the walking distance is a certain distance or less from the request point (the destination, a desired alighting point, or an expected alighting point) and at which the user can arrive along a route with an up-and-down slope (an altitude difference) of Ym or less. When boarding, the user can board at a common point to which the walking time is X minutes or less or the walking distance is a certain distance or less from the request point (the current location, a desired boarding point, or an expected boarding point etc.) and at which the user can arrive along a route with an up-and-down slope (an altitude difference) of Y m or less.

In step 102, the processor 10 acquires a request point included in the request. Request points regarding the alighting include a desired alighting point, the destination, an expected point at which the user desires to alight, and a point at which the user tends to alight. The destination is a point at which a user having alighted will finally arrive after alighting. Request points regarding the boarding include a desired boarding point, the current location, an expected point at which the user desires to board, and a point at which the user tends to board. The destination in the alighting request is a point to which the user moves after alighting.

The processor 10 can calculate and obtain the request point from information associated with the user included in the request. The processor 10 may calculate the user's boarding or alighting point from the user's schedule included in the request. The processor 10 may estimate a destination at which the user stops off from the user's preference included in the request and calculate a boarding or alighting point for reaching the destination. The processor 10 may estimate a destination at which the user stops off from the history of the user included in the request and calculate a boarding or alighting point for reaching the destination.

In step 103, the processor 10 sets a predetermined range. The predetermined range is a range in which one trip (vehicle allocation service) for moving a vehicle is performed in response to the requests from users.

Figure 4A:
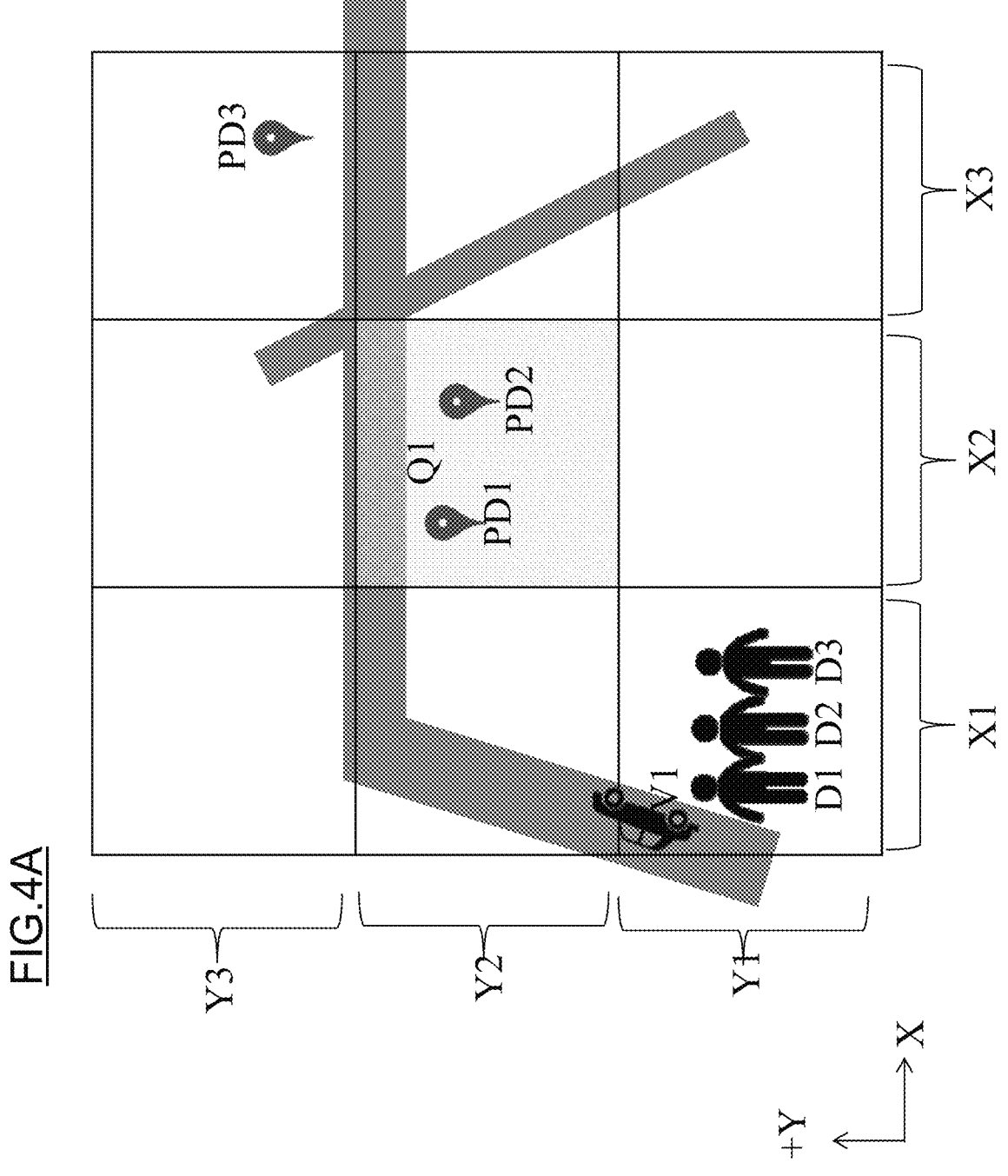
FIG. 4A is a diagram illustrating a first example of a scheme of setting a predetermined range in one or more embodiments of the present invention.

The predetermined range may be an area that is preliminarily set. A predetermined section may be defined as the predetermined range on the basis of the latitude and longitude (coordinates) on the map information 123. For example, as illustrated in FIG. 4A, a predetermined range Q1 may be set as a range that is preliminarily defined by (X2, Y2) in accordance with a mesh section of the map information 123. The shape of the predetermined range is not limited. The shape of the predetermined range may be any of a polygon, a circle/ellipse, and a shape having an irregular outer edge. The scheme of defining the size of the predetermined range is not limited, but the predetermined range is set as a common-sense range so that a user (person) can access the predetermined point on foot. For example, in the case of a rectangular predetermined range, the size of the predetermined range may be 1 km square. By preliminarily defining the predetermined range, it is possible to reduce the load of a process of specifying a user. The position of a predetermined point of interesting (POI) may be employed as a reference point.

Figure 4B:
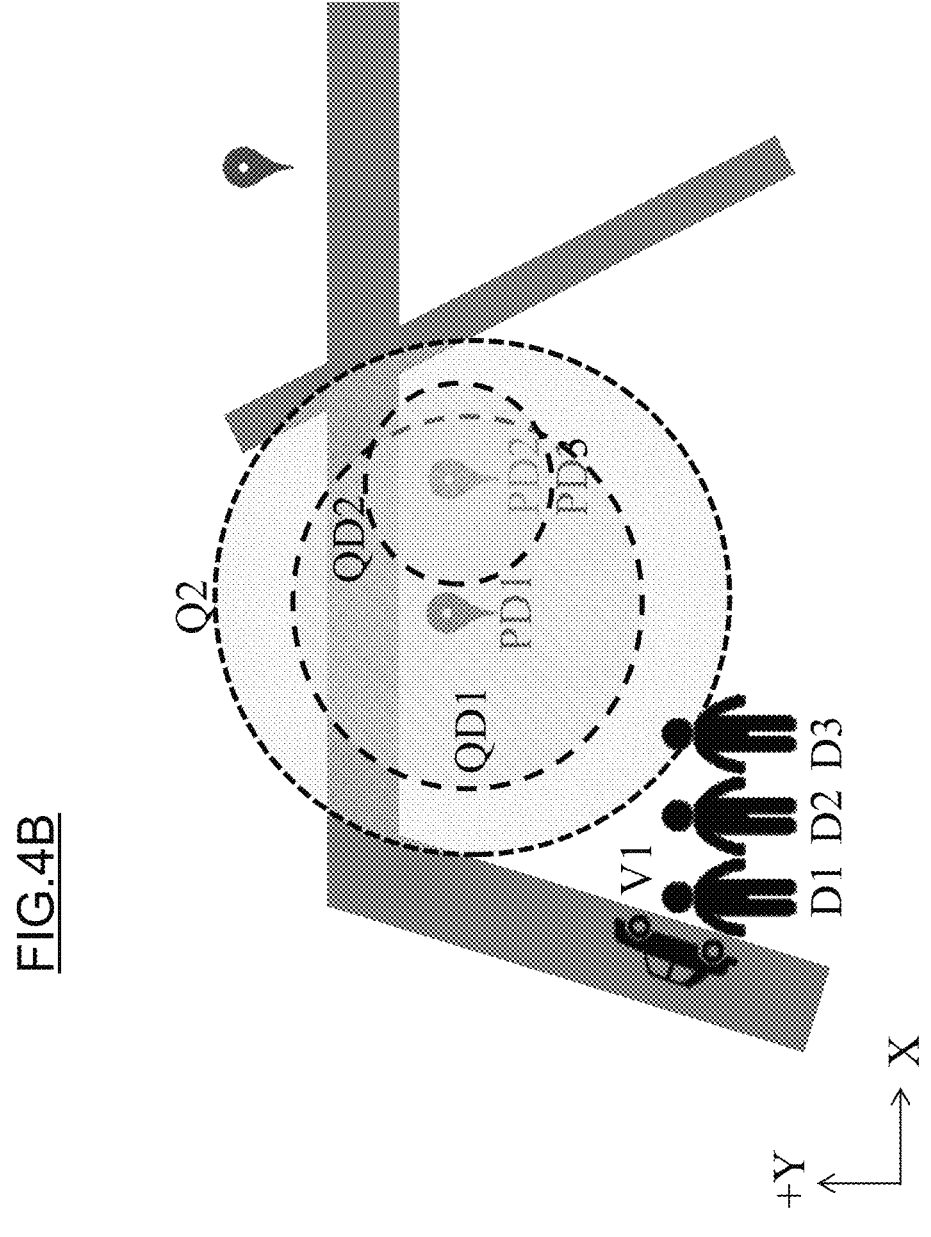
FIG. 4B is a diagram illustrating a second example of a scheme of setting a predetermined range in one or more embodiments of the present invention.

As illustrated in FIG. 4B, a predetermined range Q2 (illustrated by a broken line) may be defined using a request point or the like as the reference point. For example, the predetermined range Q2 corresponding to a user D1 who made a vehicle allocation request may be set with reference to a request point PD1 of the boarding user D1. The predetermined range Q2 may also be set as an area that includes a user range QD1 based on the request point PD1 of the user D1. For example, the predetermined range Q2 may be set so as to include request points PD1, PD2, PD3 (arrival points such as destination point, and alighting point) of a plurality of users D1, D2, and D3 who made the vehicle allocation requests. In the example illustrated in the figure, the predetermined range Q2 is set as a circular area having a constant radius, for example, 500 m, around the request point PD1 of the user D1 who made the vehicle allocation request.

The request point of a user as a reference when setting the predetermined range Q2 may be the request point of a user from whom a vehicle allocation request is newly acquired or may also be the request point of the user for whom execution (vehicle allocation) of the request has already been performed. The range in which walking is possible is set using information on the route which is included in the map information 123 and along which walking is possible. The predetermined range Q2 may be set as a range that can be reached within a predetermined time (e.g., within 5 minutes) from the request point (departure point) of the user D1 or may also be set as an area including the user range QD1 that can be reached on foot within 3 minutes. By setting the predetermined range Q2 so as to include the request points, it is possible to create the vehicle allocation plan in which the predetermined points are set, including the alighting points along the desires of users.

In a process of setting the predetermined range Q2 on the basis of the request points, user ranges QD1 and QD2 may be set in accordance with the request points of respective users, and the predetermined range Q2 may be set to include the user ranges QD1 and QD2. When the predetermined range Q2 is set from the user ranges QD1 and QD2 based on the request points, the attribute of each user included in the request is taken into account. That is, the user ranges QD1 and QD2 are set on the basis of the attributes of the users. When the attribute of the user D2 is being an elderly person, a child, or a person with a child, carrying a large/heavy baggage, or having a handicap such as an injury, the size (diameter) of the user range QD2 is set small. On the other hand, when the attribute of the user D1 is not being an elderly person, a child, or a person with a child, carrying a small/light baggage, or having no handicap such as an injury, the size (diameter) of the user range QD1 is set relatively large. By taking into account the attributes of users when setting a predetermined range Q, it is possible to create the vehicle allocation plan in which the predetermined points are set, including the alighting points determined to give importance to the convenience of the users.

In step 104, the processor 10 specifies a user who is expected to alight at a point included in the predetermined range. The processor 10 narrows down users who board the vehicle or alight from the vehicle within the predetermined range as the targets and attempts to make a vehicle allocation plan in which the narrowed-down users are allowed to board/alight. Points included in the predetermined range include a request point and a common point. When the predetermined range is set on the basis of a request point, users are specified on the basis of one or more request points. By specifying the users on the basis of the request points, it is possible to create the vehicle allocation plan in which the predetermined points are set, including the alighting points along the desires of users.

Users targeted for the vehicle allocation plan are not limited to the users who board/alight within the predetermined range, and all the users who transmitted requests may be targeted.

In step 105, the processor 10 calculates a common point at which a specified user alights as the predetermined point. A single common point may be calculated or a plurality of common points may also be calculated.

The processor 10 may calculate a common point that is a point at which a plurality of users of specified users alights. The common point in this case is a predetermined point at which the plurality of users get together and then alight. The plurality of users is allowed to alight at one common point; therefore, the number of stops can be reduced, and one trip time can be shortened when compared on the same route. By reducing the number of stops, it is possible to suppress the energy consumption, improve the fuel efficiency of the vehicle, and reduce the time required for passing from the first predetermined point to the last predetermined point in the vehicle allocation service.

Schemes of calculating a common point will then be described with reference to FIGS. 5A to 5C.

<First Scheme>

The processor 10 calculates the common point on the basis of the request point included in the request from a user. The common point may be the center or weighted center of an area that includes the request points of a plurality of users. When there is a place in which an evacuation area or the like is set in an area including the request points of a plurality of users (a place in which it is easy for the vehicle to park), the place is set as the common point. By calculating the common point on the basis of the request points, it is possible to create the vehicle allocation plan in which the common point is set along the desires of users.

<Second Scheme>

Figure 5A:
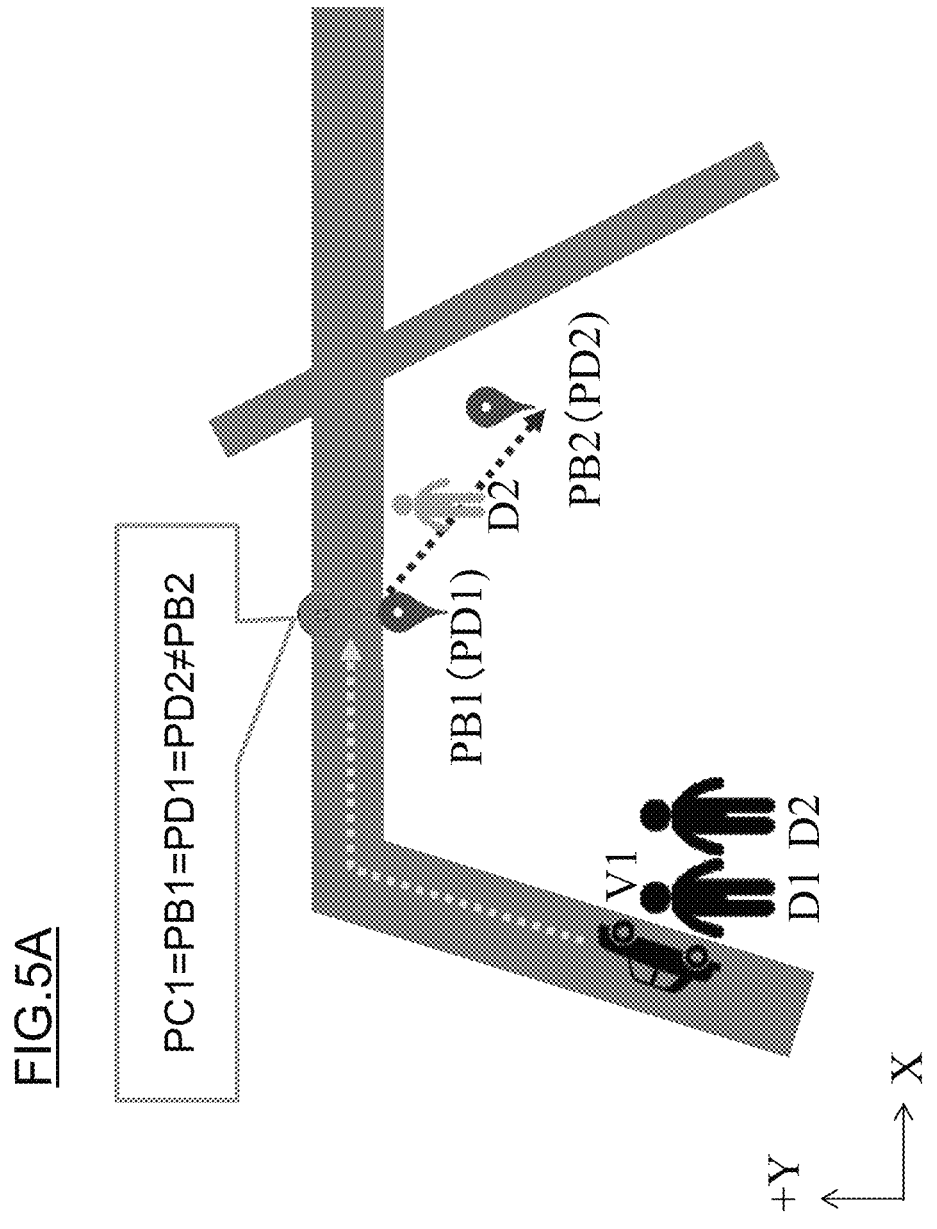
FIG. 5A is a diagram illustrating a first example of a scheme of calculating a common point for alighting.

As illustrated in FIG. 5A, the common point PC1 may be a request point related to a request of one user from among a plurality of users. When the execution of the request for allocation is already determined, the request point PD1 may be set as the common point PC1. The request point PD1 of the user D1 who requests the allocation first among the plurality of users D1 and D2 is defined as a common point PC1. Although not illustrated, the request point PD2 indicated by the request of the user D2 who has recently (later) requested among the multiple users D1 and D2 may be set as the common point. When there is one user, that is, when there is one request point, a point near the request point is set as the common point. By setting the request point of a user as the common point, it is possible to create the vehicle allocation plan in which the common point is set along the desire of the user. Additionally or alternatively, when there is a place in which it is easy for the vehicle to park, such as a place in which an evacuation area or the like is set near the request point, the point of the place is set as the common point.

The common point may be calculated as a point at which a plurality of users of specified users alights. The common point in this case is a predetermined point at which the plurality of users gets together and then alight. The plurality of users is allowed to alight at one common point; therefore, the number of stops can be reduced, and one trip time can be shortened. By reducing the number of stops, it is possible to suppress the energy consumption, improve the fuel efficiency of the vehicle, and reduce the time required for passing from the first predetermined point to the last predetermined point in the vehicle allocation service. The same effects can be obtained also in the third schemes.

<Third Scheme>

The processor 10 sets the common point to a point for which a determination is made that the access costs for a plurality of users are equivalent. In this scheme, the access cost for a user who desires to alight is a cost calculated from the distance for the user to reach a destination (request point) from an arbitrary point (common point), the time for the user to reach the destination (request point) from the arbitrary point (common point), or the load for the user to reach the destination (request point) from the arbitrary point (common point). The user alights and goes to the request point. The request point includes a final destination of the users and a waypoint (station) for reaching the final destination of the users.

For an arbitrary point, the processor 10 calculates the access costs for a plurality of users. The access cost regarding the arrival time for the user and the access cost regarding the distance for the user are determined through referring to the map information 123 to calculate the distance from an arbitrary point (common point) to the request point (desired alighting point, destination), reading the walking speed of a general pedestrian, which is preliminarily stored, and calculating the time until the user arrives at the request point from the arbitrary point or the time at which the user arrives at the request point from the arbitrary point. The access cost regarding the arrival time of a user may be affected by the attribute of the user. The processor 10 may calculate the access cost by setting the walking speed to be lower as the age of the user is a predetermined value (old age) or more and the age is higher. The processor 10 may also calculate the access cost by setting the walking speed to be lower as the age of the user is less than a predetermined value (child) and the age is lower. When the user carries a large baggage such as a suitcase, the processor 10 may calculate the access cost by setting the walking speed to be lower than when the user does not carry such a baggage.

The processor 10 sequentially sets an arbitrary point on the route as a provisional common point, obtains respective routes for users from the provisional common point to the request point, and calculates the time required for each user to reach the request point along the route for the user. A provisional common point having the smallest arrival time difference at the request point from the provisional common point is obtained as the common point to which the access costs for the users are equivalent. Provisional common points may be preliminarily registered in the map information 123. The provisional common points to be preliminarily set may be set by selecting points to which the access difficulty level, which represents the difficulty for the vehicle to make a stop, is less than a predetermined value (access cost is low).

The distance and time for a user to reach the request point from an arbitrary point (common point) on foot may be determined by taking into account not only the length of a road in the map information 123 but also a specific position of the request point, such as the floor of a facility or the position in the facility. In a large facility, the distance (required time) from an entrance to a destination (shop) is necessary for the user and may affect the distance (required time) to the request point. The processor 10 refers to a map of the facility in the map information 123 to calculate the distance (required time) from the entrance to the destination in the facility.

The access cost regarding the load can be set in accordance with the attribute of a user. The access cost regarding the load may be added to the access cost regarding the distance or time or may also be used as a weighting coefficient for the access cost regarding the distance or time. When there is an altitude difference of a predetermined value or more along the route from an arbitrary point (common point) to the request point, the access cost regarding the load is calculated high. For example, when the user has to cross the overpass of a grade separation to move from an arbitrary point (common point) to the request point, the access cost is calculated high. This is because the up-and-down load on the overpass stairs is taken into account. When there is a slope along the route from an arbitrary point (common point) to the request point and the user goes up the slope, the access cost is calculated higher than when going down the slope. This is because the load of going up the slope is taken into account. The slope of a route can be acquired from the road information 122. When the user has to cross a pedestrian crosswalk along the route from an arbitrary point (common point) to the request point, the access cost is calculated high. This is because the load of moving to the opposite lane is taken into account. When the request point is in a large facility, the access cost is calculated high. This is because the load of moving from an entrance to a destination in the facility is taken into account.

When a user carries a large baggage in the attribute of the user obtained with the request, the access cost is calculated high. This is because the load of carrying the baggage is taken into account. When the age of a user is a predetermined value (old age) or more in the attribute of the user obtained with the request, the higher the age, the higher the access cost is calculated, while when the age is less than a predetermined value (child), the lower the age, the higher the access cost is calculated. When the distance or time accepted for movement is less than a predetermined value in the requirement from a user obtained with the request, the access cost is calculated higher than otherwise. This is because individual differences in the acceptance for movement are taken into account.

The calculation result of the access cost regarding the load may be used as a weighting coefficient for calculating the access cost regarding the distance/time. The coefficient can be set such that the access cost regarding the distance/time is a higher value as the value of the access cost regarding the load increases.

The processor 10 compares the access cost for a first user with the access cost for a second user different from the first user. The processor 10 calculates, as the common point, an arbitrary point for which a determination is made that the access costs regarding the time/distance/load from the common point to the request point (destination) are equivalent, that is, an arbitrary point for which a determination is made that the difference between the arrival time/distance/load for the first user to reach the request point from the common point and the arrival time/distance/load for the second user to reach the reach the request point from the common point is less than a predetermined value or minimized. This common point is the predetermined point to which the target vehicle to be allocated moves and one or more users alight. The common point is the user's the alighting points.

Here, the first user and the second user are described, but also for three or more users, the common point is calculated as an arbitrary point for which a determination is made that the difference between the arrival time/distance/load for a user to reach the request point from the common point and the arrival time/distance/load for another user to reach the common point is less than a predetermined value.

Figure 5B:
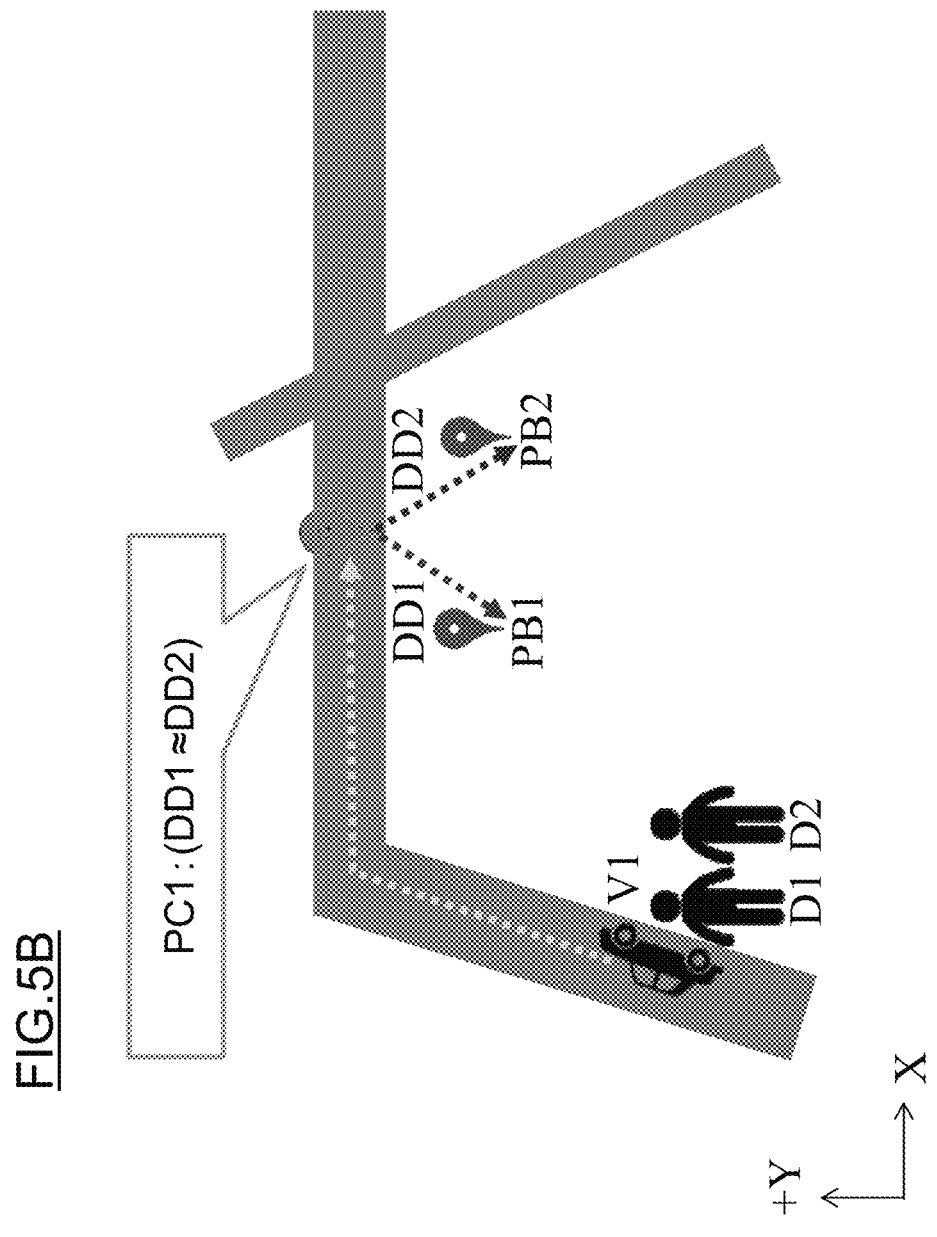
FIG. 5B is a diagram illustrating a second example of a scheme of calculating a common point for alighting.

As illustrated in FIG. 5B, a common point PC1 is calculated as the position at which a distance DD1 (time TD1) for a user D1 to reach a request point PB1 from the common point PC1 is substantially equal to a distance DD2 (time TD2) for a user D2 to reach the request point PB2 from the common point PC1. Under the condition that the distance DD1 (time TD1) and the distance DD2 (time TD2) are substantially equal, the users D1 and D2 moving from the common point PC1 to the request points (PB1, PB2) undertake similar access costs (walking distances, walking time, loads such as going up and down). This allows the vehicle to be allocated so that a plurality of users shares the same level of access cost, and the reliability of the system for the users can be enhanced.

<Fourth Scheme>

The processor 10 calculates the access cost for a vehicle from an access difficulty level for the vehicle to reach the common point and calculates, as the common point, a point to which the access cost for the vehicle is lower than a predetermined value.

For each of arbitrary points, the processor 10 calculates the access difficulty level for a vehicle. The access difficulty level for a vehicle is determined, for example, using the access time or access distance to an arbitrary point (common point), the allowed staying time at an arbitrary point (common point), the presence or absence of a traffic signal (or the number of traffic signals) on the route to an arbitrary point (common point), and/or the necessity of a U-turn on the route to an arbitrary point (common point). The access cost is calculated as a higher value as the value of the access time or access distance for a vehicle to reach an arbitrary point (common point) increases. The access cost is calculated as a higher value as the allowed staying time at an arbitrary point (common point) decreases. The allowed staying time may be set in accordance with the traffic volume. As the traffic volume at an arbitrary point (common point) increases, the allowed staying time decreases, and the access cost is therefore calculated as a higher value. When there is a traffic signal on the route to an arbitrary point (common point), the access cost is calculated as a higher value than when there is no traffic signal. The access cost is calculated as a higher value as the number of traffic signals on the route to an arbitrary point (common point) increases. When a U-turn is required on the route to an arbitrary point (common point), the access cost is calculated to a higher value than when no U-turn is required.

The processor 10 compares the access cost to each arbitrary point (common point) with a set threshold. The processor 10 calculates, as the common point, an arbitrary point to which the access cost is a lower value than a predetermined value. This common point is the predetermined point to which the allocated vehicle moves.

Figure 5C:
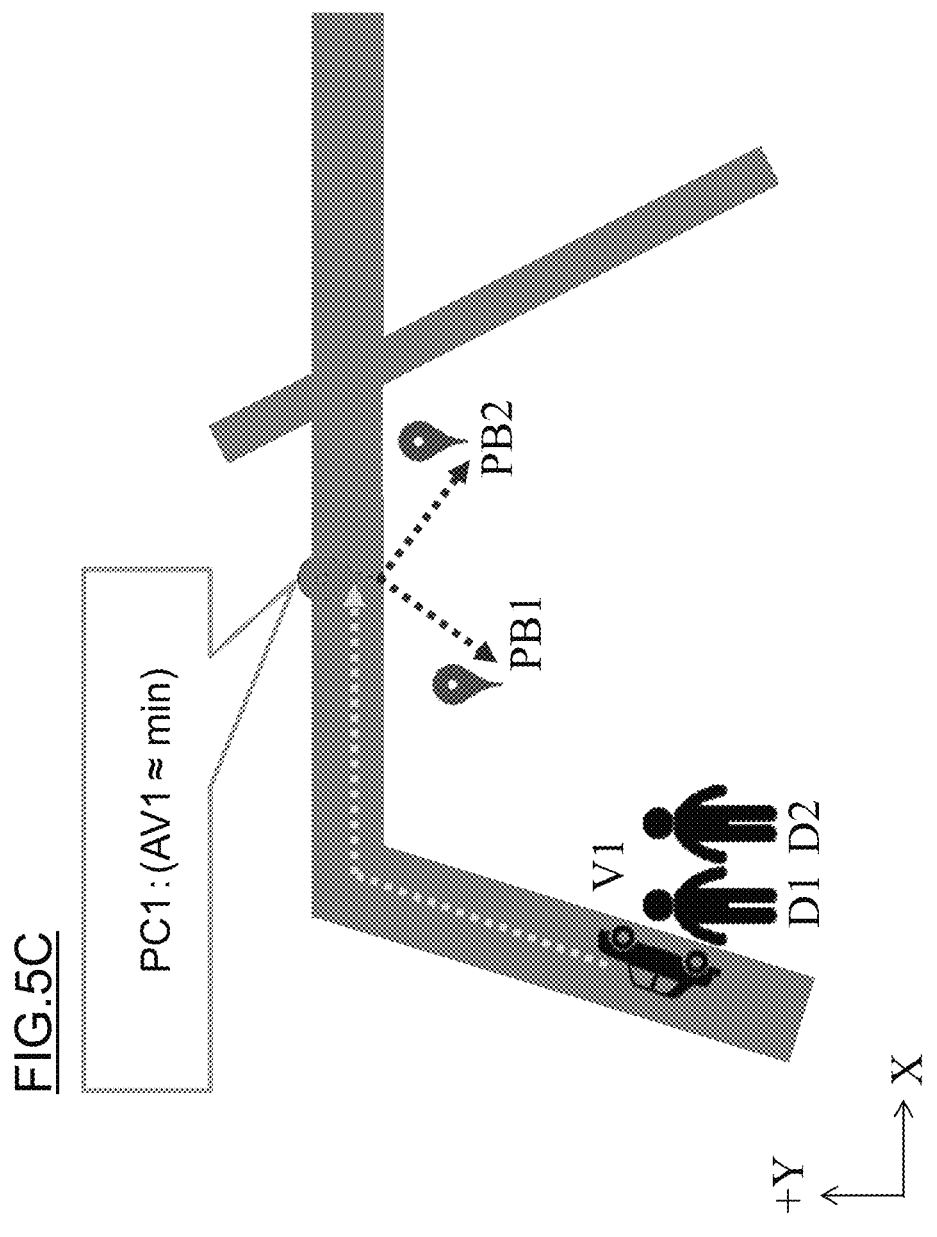
FIG. 5C is a diagram illustrating a third example of a scheme of calculating a common point for alighting.

As illustrated in FIG. 5C, the processor 10 calculates a point to which an access cost AV1 is a lower value than a predetermined value as a common point PC1. The route search process may include preliminarily calculating the access cost AV1 to each arbitrary point (common point) and storing the calculated access cost AV1 as a part of the map information 123. This allows the point with a low access cost for the vehicle to be selected as the common point, and it is possible to ensure that the vehicle is controlled to make a stop at the common point and the user is allowed to alight at the common point.

Referring again to FIG. 3, in step 106, the processor 10 presents the calculated common point to each user using the user terminal apparatus 300. A single common point may be presented or a plurality of common points may also be presented. In step 107, the processor 10 makes an inquiry to the user about the user's acceptance of the common point via the user terminal apparatus 300. The processor 10 controls the user terminal apparatus 300 to output a message for confirming the user's intention, such as «Do you accept alighting at the common point», or «Do you fix the reservation». The user terminal apparatus 300 receives the input of an acceptance instruction for the common point. The acceptance instruction includes an input command for selecting one common point from among a plurality of common points. In this case, the processor 10 controls the user terminal apparatus 300 to output a message for confirming the user's selection intention and usage intention, such as «There is a plurality of alighting point candidates. Please specify the alighting point».

In step 107, the processor 10 confirms the user's acceptance. When the user's acceptance is not obtained, the process proceeds to step 112, in which the request for alighting (or boarding) is canceled. When the user's acceptance is obtained, the process proceeds to step 108, in which one accepted common point is set as the predetermined point. The predetermined point is a point to which the allocated vehicle is controlled to move and at which the user is allowed to alight (or boarding). Thus, each predetermined point to which the vehicle is controlled to move is calculated after confirming the user's acceptance, and the user can therefore alight at a point that matches the user's intention.

In step 109, the processor 10 controls the navigation device 120 to calculate a route for sequentially following the predetermined points. The processor 10 creates a vehicle allocation plan in accordance with the calculated route. The processor 10 selects a vehicle closest to the start point of the route (predetermined point to be followed first) as the target vehicle to be allocated.

In step 110, the processor 10 transmits, to the vehicle controller 70 of the target vehicle, the created vehicle allocation plan and an instruction for the target vehicle to autonomously move along the vehicle allocation plan. The vehicle allocation plan includes the predetermined points at which the vehicle picks up/drops off the users and the route for following the predetermined points. The vehicle controller 70 executes the above-described autonomous travel control on the basis of the vehicle allocation plan and controls the vehicle to move along the route.

On the basis of the vehicle allocation plan, the vehicle controller 70 controls the vehicle to make stops at the predetermined points (including the common point and one or more request points) located along the route and opens the door for a boarding or alighting. After the door is opened, the door is closed when a predetermined time has elapsed. The processor 10 controls the vehicle controller to confirm that the vehicle has stopped. Execution of alighting (or boarding) is confirmed on the basis of the detection results from a door lock sensor (not illustrated), a seating sensor (not illustrated), and a seat belt sensor (not illustrated) included in the sensor 60 and images captured by a vehicle interior camera (not illustrated) included in the detection device 50. After the users' alighting (or boarding) included in the vehicle allocation plan is completed, the vehicle is controlled to move to the next predetermined point. The processor 10 creates a vehicle allocation plan for another target vehicle and transmits an instruction for the target vehicle to autonomously move along the vehicle allocation plan to the vehicle controller 70 of the target vehicle.

In this example, the alighting point determination apparatus 100 operates to control the creation/execution of the vehicle allocation plan. The creation/execution of the vehicle allocation plan may be executed by a processor (not illustrated) provided separately in the vehicle allocation system 1.

The alighting point determination apparatus 100 according to one or more embodiments of the present invention is configured and operates as the above and therefore has the following effects.

(1) The alighting point determination method according to one or more embodiments of the present invention includes specifying a second user who is expected to alight in a predetermined range including a point associated with a first user and calculating, as the predetermined point, a common point at which users including at least the first user and the second user alight, and it is therefore possible to prevent a vehicle from making frequent stops and suppress an increase in the trip time while responding to the request from each user who desires the use of the vehicle allocation system. By reducing the number of stops, it is possible to suppress the energy consumption, improve the fuel efficiency of the vehicle, and reduce the time required for passing from the first predetermined point to the last predetermined point in the vehicle allocation service.

According to the alighting point determination method in one or more embodiments of the present invention, one vehicle is used by a plurality of users and it is therefore possible to prevent the vehicle from making frequent stops and suppress an increase in the trip time. By reducing the number of stops, it is possible to suppress the energy consumption, improve the fuel efficiency of the vehicle, and reduce the time required for passing from the first predetermined point to the last predetermined point in the vehicle allocation service. Moreover, the usage efficiency of the vehicle can be improved.

According to the alighting point determination method in one or more embodiments of the present invention, the processor operates to calculate the common point that is a point at which a plurality of users of specified users alight. The common point is a predetermined point at which the vehicle and one or more users get off together. The plurality of users is allowed to alight at one common point; therefore, the number of stops can be reduced, and one trip time (the time required for passing from the first predetermined point to the last predetermined point in the vehicle allocation service) can be shortened. By reducing the number of stops, it can be expected to suppress the energy consumption and improve the fuel efficiency of the vehicle.

(2) According to the alighting point determination method in one or more embodiments of the present invention, users are specified on the basis of one or more request points and it is therefore possible to calculate the predetermined points including the alighting points along the desires of users. The users who share a ride on a vehicle and then get off from a vehicle can be preliminarily specified; therefore, unnecessary information is not given to unrelated users and the system load can be reduced.

(3) According to the boarding point determination method in one or more embodiments of the present invention, by calculating the common point on the basis of the request point, it is possible to calculate the common point along the desire of a user. The common point is calculated on the basis of the request point of a user, and a reasonable common point can therefore be calculated with consideration for the distance to the request point. When there is a plurality of specified users, a common point reasonable for the plurality of users can be calculated on the basis of the request points of the plurality of users. When there is one specified user, a common point reasonable for the user can be calculated on the basis of the request point of the user.

(4) According to the alighting point determination method in one or more embodiments of the present invention, by calculating/determining the request point of a user as the common point, it is possible to calculate the common point along the desire of the user. A request point may be set as the common point. Among the request points of a plurality of users, one request point of a user or request points of a plurality of users may be set as the common point, and the number of users moving to the request point from the common point can therefore be minimized. The process of calculating the common point is not required, and the system load can therefore be reduced. When there is one specified user, a common point reasonable for the user and a vehicle to be allocated can be obtained without a calculation load because the request point of the user is set as the common point.

(5) According to the alighting point determination method in one or more embodiments of the present invention, the request point is set as the alighting point desired by a user, or the destination point of a user, and the common point can thereby be calculated as a point that is convenient for a user who desires alighting.

(6) According to the alighting point determination method in one or more embodiments of the present invention, the cost calculated from any one of the time for a user to reach the request point from the common point, the distance for the user to reach the request point from the common point, and the load for the user to reach the request point from the common point, is calculated as the access cost for the user, and a point for which a determination is made that the access cost for a first user and the access cost for a second user are equivalent is calculated as the common point. This allows the vehicle to be allocated so that a plurality of users shares the same level of access cost, and the reliability of the system for the users can thus be enhanced.

(7) According to the alighting point determination method in one or more embodiments of the present invention, the access cost for a vehicle is calculated from the access difficulty level for the vehicle to reach the common point, and a point to which the access cost for the vehicle is a lower value than a predetermined value is calculated as the common point. It is therefore possible to ensure that the vehicle is controlled to make a stop at the common point and a user is allowed to alight at the common point.

(8) According to the alighting point determination method in one or more embodiments of the present invention, the predetermined range is set as an area that is preliminarily set, and the load of the calculation process for specifying a user can therefore be reduced.

(9) According to the alighting point determination method in one or more embodiments of the present invention, by determining the predetermined range so as to include the request points, users can be narrowed down to those located in the vicinity of respective request points, and the predetermined points can therefore be set to include the alighting points along the desires of users. The predetermined range is determined in accordance with the users' request points which change from moment to moment, and the predetermined range can therefore be set in accordance with the current situation to specify the users.

(10) According to the alighting point determination method in one or more embodiments of the present invention, the predetermined range is set on the basis of attributes of users who made requests, and the predetermined points can be set, including the alighting points determined to give importance to the convenience of the users.

(11) According to the alighting point determination method in one or more embodiments of the present invention, an inquiry is made to a user about an acceptance of the common point, and the common point is set as the predetermined position when the acceptance is obtained from the user; therefore, the user is allowed to alight at the point which matches the user's intention.

(12) According to the alighting point determination method in one or more embodiments of the present invention, the vehicle has an autonomous travel function. By calculating the common point, it is possible to reduce the number of points at which the autonomously traveling vehicle makes stops to allow the users to alight, thus reducing the trip time. The autonomous traveling is performed on the basis of the vehicle allocation plan in which the predetermined points are defined to allow the users to alight, and human errors do not occur, such as the vehicle passing through the predetermined point without noticing the stop point.

(13) The alighting point determination apparatus 100 according to one or more embodiments of the present invention has similar actions and effects to those obtained by the above-described alighting point determination method.

Embodiments heretofore explained are described to facilitate understanding of the present invention and are not described to limit the present invention. It is therefore intended that the elements disclosed in the above embodiments include all design changes and equivalents to fall within the technical scope of the present invention.

DESCRIPTION OF REFERENCE NUMERALS

1 Vehicle allocation system
100 Alighting point determination apparatus
  10 Processor
    11 CPU
    12 ROM
    13 RAM
  20 Communication device
  30 Output device
200 Control device, onboard apparatus
  40 Communication device
  50 Detection device
    51 Camera
    52 Radar device
    53 Vehicle diagnosis device
  60 Sensor
    61 Steering angle sensor
    62 Vehicle speed sensor
  70 Vehicle controller
    71 Processor
  80 Driving device
    81 Braking device
  90 Steering device
  110 Output device
    111 Display
    112 Speaker
  120 Navigation device
    121 Position detection device
    122 Road information
    123 Map information
300 User terminal apparatus
  310 Processor
    311 CPU
    312 ROM
    313 RAM
  320 Communication device
  330 Input/output device
    331 (Touch panel-type) display
    332 Speaker
  340 Position detection device

The invention claimed is:

1. An alighting point determination method for allocating a vehicle in response to requests from users, the method comprising:

setting, by a processor of the vehicle, a predetermined range based on coordinates on a map information, the predetermined range including:
  a first request point where a first user desires to alight from the vehicle and
  a second request point where a second user desires to alight from the vehicle;

calculating, by the processor, a predetermined point at which to move the vehicle, based on the first request point and the second request point;
specifying, by the processor:
  the first user based on the first request and
  the second user based on the second request;
calculating, by the processor, an access cost for the first user based on any one or more of:
  a distance from the predetermined point to a first destination of the first user,
  a time from the predetermined point to the first destination, and
  a load from the predetermined point to the first destination;
calculating, by the processor, an access cost for the second user based on any one or more of:
  a distance from the predetermined point to a second destination of the second user,
  a time from the predetermined point to the second destination, and
  a load from the predetermined point to the second destination;
calculating, by the processor, the access cost for the first user as higher when the first user carries large baggage, based on the request from the first user including a form of baggage carried by the first user, compared to when the first user does not carry large baggage;
calculating, by the processor, the access cost for the second user as higher when the second user carries large baggage, based on the request from the second user including a form of baggage carried by the second user, compared to when the second user does not carry large baggage;
comparing the access cost for the first user with the access cost for the second user different from the first user;
calculating, by the processor, a common point as the predetermined point at which the first user and the second user alight from the vehicle and the access cost for the first user and the access cost for the second user are determined to be equivalent;
wherein the processor operates to:
  notify each user of the common point;
  make an inquiry to each user about an acceptance of the common point; and
  set the common point as a predetermined position when the acceptances are obtained from each user.

2. The alighting point determination method according to claim 1,
wherein each request includes a request point of the user and
wherein the processor operates to specify the users based on one or more of the request points.

3. The alighting point determination method according to claim 1, wherein the processor operates to:
calculate an access cost for the vehicle from an access difficulty level for the vehicle to reach the common point; and
calculate as the common point a point to which the access cost for the vehicle is a lower value than a predetermined value.

4. The alighting point determination method according to claim 1, wherein the predetermined range is an area that is preliminarily set.

5. The alighting point determination method according to claim 1,
wherein the request from the first user includes a request point of the first user and wherein the processor operates to determine the predetermined range so as to include the request point.

6. The alighting point determination method according to claim 1, wherein the processor operates to set the predetermined range on a basis of an attribute of the user who made the request.

7. The alighting point determination method according to claim 1, wherein the vehicle has an autonomous travel function.

8. An alighting point determination apparatus for allocating a vehicle in response to requests from users, the alighting point determination apparatus comprising a processor, configured to:

set a predetermined range based on coordinates on a map information, the predetermined range including:

a first request point where a first user desires to alight from the vehicle and a second request point where a second user desires to alight from the vehicle;

calculate a predetermined point at which to move the vehicle, based on the first request point and the second request point;

specify:

the first user based on the first request and the second user based on the second request;

calculate an access cost for the first user based on any one or more of:

a distance from the predetermined point to a first destination of the first user, a time from the predetermined point to the first destination, and a load from the predetermined point to the first destination;

calculate an access cost for the second user based on any one or more of:

a distance from the predetermined point to a second destination of the second user, a time from the predetermined point to the second destination, and a load from the predetermined point to the second destination;

calculate the access cost for the first user as higher when the first user carries large baggage, based on the request from the first user including a form of baggage carried by the first user, compared to when the first user does not carry large baggage;

calculate the access cost for the second user as higher when the second user carries large baggage, based on the request from the second user including a form of baggage carried by the second user, compared to when the second user does not carry large baggage;

compare the access cost for the first user with the access cost for the second user different from the first user;

calculate a common point as the predetermined point at which the first user and the second user alight from the vehicle and the access cost for the first user and the access cost for the second user are determined to be equivalent, wherein the processor operates to:

notify each user of the common point;

make an inquiry to each user about an acceptance of the common point; and set the common point as a predetermined position when the acceptances are obtained from each user.

* * * * *